US005298306A

United States Patent [19]

Miller

[11] Patent Number: 5,298,306

[45] Date of Patent: Mar. 29, 1994

[54] SOFT-FEEL VEHICLE DOOR HANDLE

[75] Inventor: Leonard G. Miller, Orchard Lake, Mich.

[73] Assignee: Molmec Inc., Walled Lake, Mich.

[21] Appl. No.: 912,338

[22] Filed: Jul. 10, 1992

[51] Int. Cl.[5] .............................................. B32B 1/06

[52] U.S. Cl. .............................................. 428/68; 428/71; 428/76; 428/318.6; 428/318.8; 428/217; 16/110 R; 16/116 R; 74/551.9

[58] Field of Search .................. 428/76, 68, 217, 218; 16/110 R, 116 R; 74/551.9

[56] References Cited

U.S. PATENT DOCUMENTS

| | | | |
|---|---|---|---|
| 3,471,355 | 10/1969 | Truesdell et al. | 428/217 |
| 4,291,076 | 9/1981 | Katoh | 428/217 |
| 4,443,508 | 4/1984 | Mehl | 428/217 |
| 4,686,741 | 8/1987 | Moore et al. | 16/112 |
| 5,037,687 | 8/1991 | Kargarzadeh et al. | 428/71 |

*Primary Examiner*—Alexander S. Thomas
*Attorney, Agent, or Firm*—Reising, Ethington, Barnard, Perry & Milton

[57] ABSTRACT

The invention relates to a soft-feel vehicle door handle having a glass filled vinyl plastic core element which is overlayed with a soft plastic vinyl skin mold bonded thereto and which skin has a durometer hardness in the range of 50 to 100 and a thickness in the range of 0.2 to 2.0 millimeters.

2 Claims, 1 Drawing Sheet

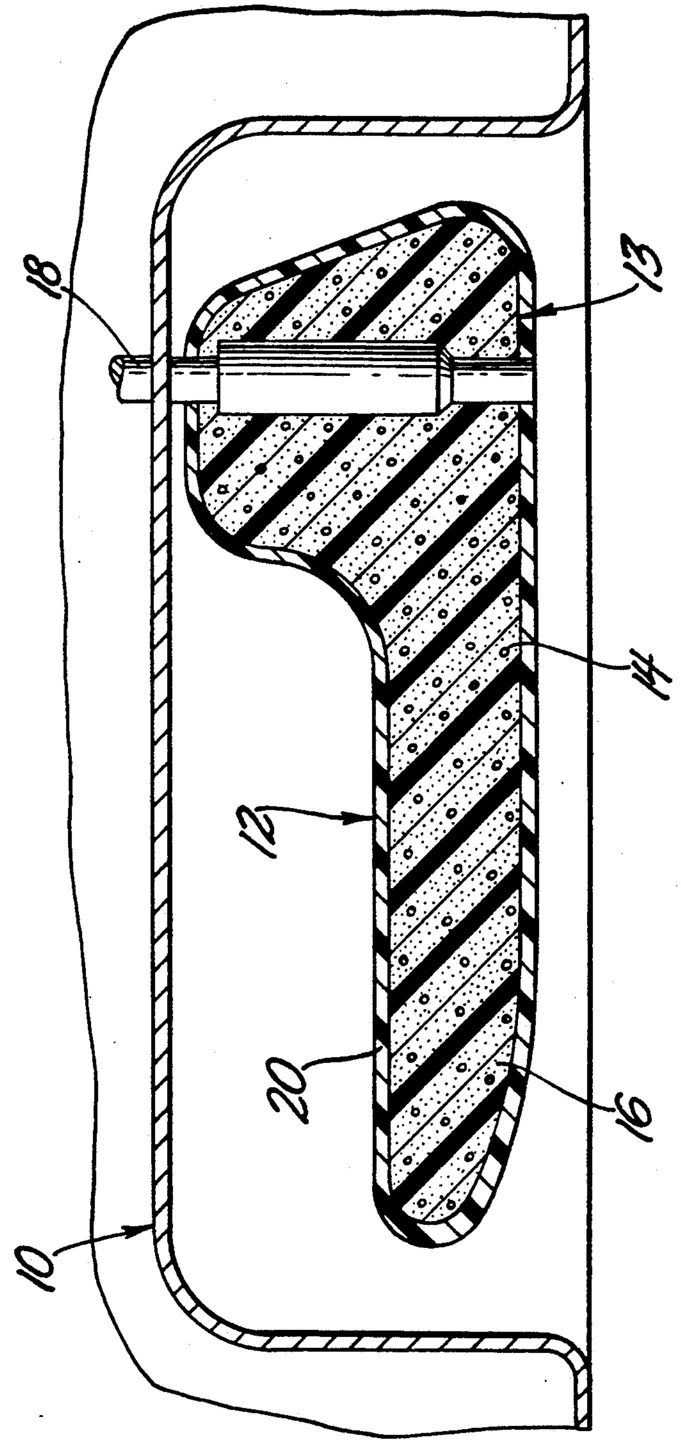
18
13
14
12
20
16
10

SOFT-FEEL VEHICLE DOOR HANDLE

TECHNICAL FIELD

The present invention relates to a vehicle door handle having a soft or leather-like feel to a user. While vehicle door handles having such a soft feel are generally known to be old, such previous designs have proved to be unsatisfactory for several reasons. The most common way to make such previous designs having a soft-feel, is to utilize a rigid or hard substrate or core element, overlaying such core element with a foam layer and thereafter covering the entire structure with an outer layer or cover element. Car manufacturers have found such a combination to be unsatisfactory for several reasons. First, the use of an intermediate foam layer to create a soft feel results in too much deflection or movement of the foam layer and outer cover relative to the rigid core when the handle is used and, thus, giving the operator a feeling of looseness in the door handle.

Second, vehicle door handles are commonly mounted in door recesses today for reasons of safety and appearance. The use of an intermediate foam layer, which has no structural strength, dimensionally takes up space within a door handle recess necessitating the use of a smaller and thus weaker rigid core element or substrate, thus, resulting in a weaker door handle.

Finally, foam deteriorates over time and in use due to the breakdown of the foam structure thereby degrading the handle appearance and creating a looseness to the touch.

An objective of the present invention is to create a door handle which eliminates the use of an intermediate foam layer in such a way that a soft outer layer can be bonded directly to a rigid core element or substrate and thereby enhancing the strength, durability and feel of the door handle.

Other approaches to achieving soft-feel and commonly used with steering wheels are to wrap a soft adhesively-backed strip about the gripping surface or to overlay the surface with leather or a leather-like material which is stitched or sewn for retention. These approaches are unsatisfactory both due to appearance and lack of durability.

BACKGROUND ART

U.S. Pat. No. 4,686,741 Moore et al typifies a handle of the type utilizing a rigid substrate overlayed with a foam strip and enclosed by a plastic cover. A similar design is shown in U.S. Pat. No. 5,037,687 Kargarzadeh et al. Once again, this design utilizes a rigid reinforcing strip, a foam core and an outer skin formed about the foam core and strip. In common, the foregoing designs suffer from the operational problems noted above.

DISCLOSURE OF THE INVENTION

The vehicle door handle of the present invention includes a plastic rigid core element or substrate which provides the overall door handle shape and structural strength and with the substrate entirely or partially overlayed with a soft-feel outer skin formed of a plastic material compatible with the substrate enabling the skin to be chemically bonded to the substrate thereby avoiding the need for an intermediate adhesive layer or lacing to retain the skin on the substrate. In order to meet car manufacturers' requirements as to deflection of the soft outer skin relative to the rigid substrate, the layer or skin has a durometer hardness in the range of 50 to 100. In addition, the outer skin layer has a thickness in the range of 0.2 to 2.0 millimeters.

As noted above, by utilizing such an outer skin directly bonded to a compatible substrate and eliminating an intermediate foam layer, a larger and thus stronger rigid core element may be utilized while still fitting in the vehicle door recess provided for the handle.

BRIEF DESCRIPTION OF DRAWING

The drawing is a sectional elevation through the door handle and door recess illustrating the invention.

BEST MODE FOR CARRYING OUT THE INVENTION

While most soft-feel vehicle door handles are utilized for interior door handles, particularly since such handles utilizing foam layers tend to seriously deteriorate in an external environment, the present invention in eliminating such a foam core element can be utilized either as an inside or outside door handle. As seen in the drawing, a door handle recess is indicated generally at 10 and is adapted to be suitably secured to the appropriate and adjacent vehicle door panel. A door handle is indicated generally at 12 and includes a rigid structural core element or substrate 13 having an enlarged end 14 and a laterally extending and gripping portion 16. The enlarged end 14 of the door handle is connected through suitable shaft 18 to a door latching linkage, not shown, to permit latching and unlatching action by the door handle. The door handle can be of a design wherein the handle rotates within the door recess 10 or pivots out of the recess in actuating the door latching mechanism.

For matters of strength, weight and bondability the door handle substrate 13 is molded of a glass filled vinyl plastic such as Geon Fiberloc which is a product of B.F. Goodrich.

Whatever the shape and size of substrate 13, as much of the substrate may be covered with a soft-feel outer skin 20 as desired. However, at least the hand gripping portion 16 of the handle will be covered with such soft-feel layer. The soft-feel outer layer 20 must be made of a plastic material which is bondable to the substrate 16 without the need for intermediate adhesive materials. In the preferred form of the invention, the outer layer 20 is formed of a soft polyvinyl chloride.

In providing such a soft-feel door handle, most car manufacturers require that the soft-feel portion of the door handle not deflect more than one (1) millimeter after being cycled at a 150–200 pound torsion load. Applicant has found that it can meet this requirement for a soft-feel handle by utilizing an outer skin vinyl material having a durometer hardness range of 50 to 100. It has been further found that both the automobile manufacturers' specification and a soft-feel can be achieved by utilizing a layer 20 in the range of 0.2 to 2.0 millimeters.

A satisfactory method for manufacturing the subject door handle is to premold the rigid handle element or substrate 13, mount and support the substrate in a suitable enclosed mold so as to leave exposed and spaced from the interior of the mold that portion of the handle to be covered by the outer skin 20 and thereafter injection molding the melted vinyl material about the door handle causing the same to bond to the compatible vinyl substrate and thereby form the soft outer skin or layer 20.

A door handle made in accordance with the teaching of this invention provides a handle which, while soft and leather-like to the touch, does not create the mushy or loose feeling which often occurs with the use of an intermediate foam layer between the outer skin and the substrate.

By eliminating such intermediate foam layer, a larger and thus stronger rigid core element 13 may be utilized within the design space allocated for the door handle. Finally, by directly bonding a soft outer layer directly to the substrate, a more durable handle results then is the case in utilizing an intermediate foam layer which inevitably deteriorates with use and over time.

The present handle also eliminates the need to use strip-wrapped and adhesively bonded or stitched outer covers.

Other variations of the invention are contemplated within the intended scope of the hereinafter appended claims.

What is claimed is:

1. A soft-feel vehicle door handle (12) connected through rotatable or pivotal means (18) to a door latching linkage to permit latching and unlatching action of a door in response to movement of said door handle, said door handle (12) comprising a hand gripping portion (16) formed of a rigid plastic core element (13), a soft plastic skin (20) chemically compatible with and mold bonded about said hand gripping portion 16, said skin having a durometer hardness in the range of 50 to 100 and thickness in the range of 0.2 to 2.0 millimeters.

2. A soft-feel door vehicle handle as set forth in claim 1 wherein said core element is a glass-filled vinyl plastic and said skin (20) is a vinyl plastic heat bondable to the core element.

* * * * *